United States Patent [19]
Kaneishi et al.

[11] Patent Number: 5,705,107
[45] Date of Patent: Jan. 6, 1998

[54] MOLDING METHOD FOR PRODUCING MOLDED ARTICLE HAVING A HOLLOW PORTION

[75] Inventors: Akimasa Kaneishi; Sinji Kiboshi, both of Hiratsuka, Japan

[73] Assignee: Mitsubishi Gas Chemical Company, Inc., Tokyo, Japan

[21] Appl. No.: 591,720

[22] Filed: Jan. 25, 1996

[30] Foreign Application Priority Data

Feb. 9, 1995 [JP] Japan .................. 7-022020

[51] Int. Cl.⁶ .................. B29C 45/00
[52] U.S. Cl. .................. 264/40.3; 264/572; 425/130
[58] Field of Search .................. 264/572, 40.3; 425/130

[56] References Cited

U.S. PATENT DOCUMENTS

| | | |
|---|---|---|
| 4,824,732 | 4/1989 | Hendry et al. |
| 5,015,166 | 5/1991 | Baxi .................. 264/572 |
| 5,056,997 | 10/1991 | Hayashi et al. .................. 264/572 |
| 5,141,682 | 8/1992 | Steinbichler et al. .................. 264/572 |
| 5,599,487 | 2/1997 | Gosdin et al. .................. 264/572 |

FOREIGN PATENT DOCUMENTS 1-128814  5/1989  Japan .

*Primary Examiner*—Catherine Timm
*Attorney, Agent, or Firm*—Wenderoth, Lind & Ponack

[57] ABSTRACT

A method for the production of a molded article having a hollow portion by utilizing a gas compression apparatus having a gas source, a compressor composed of a piston and a cylinder, and a discharge valve for controlling the flow of pressurized gas discharged from the cylinder, the method comprising introducing the pressurized gas through the discharge valve into a molten resin injected into a cavity of a mold, under the control of the discharge valve while carrying out, in one molding cycle, the intake step of supplying gas from the gas source to the cylinder and the compression step of compressing the gas by movement of the piston in the cylinder, at least twice each on the basis of predetermined compressor operation conditions, and thereby forming the hollow portion in the molded article.

10 Claims, 7 Drawing Sheets

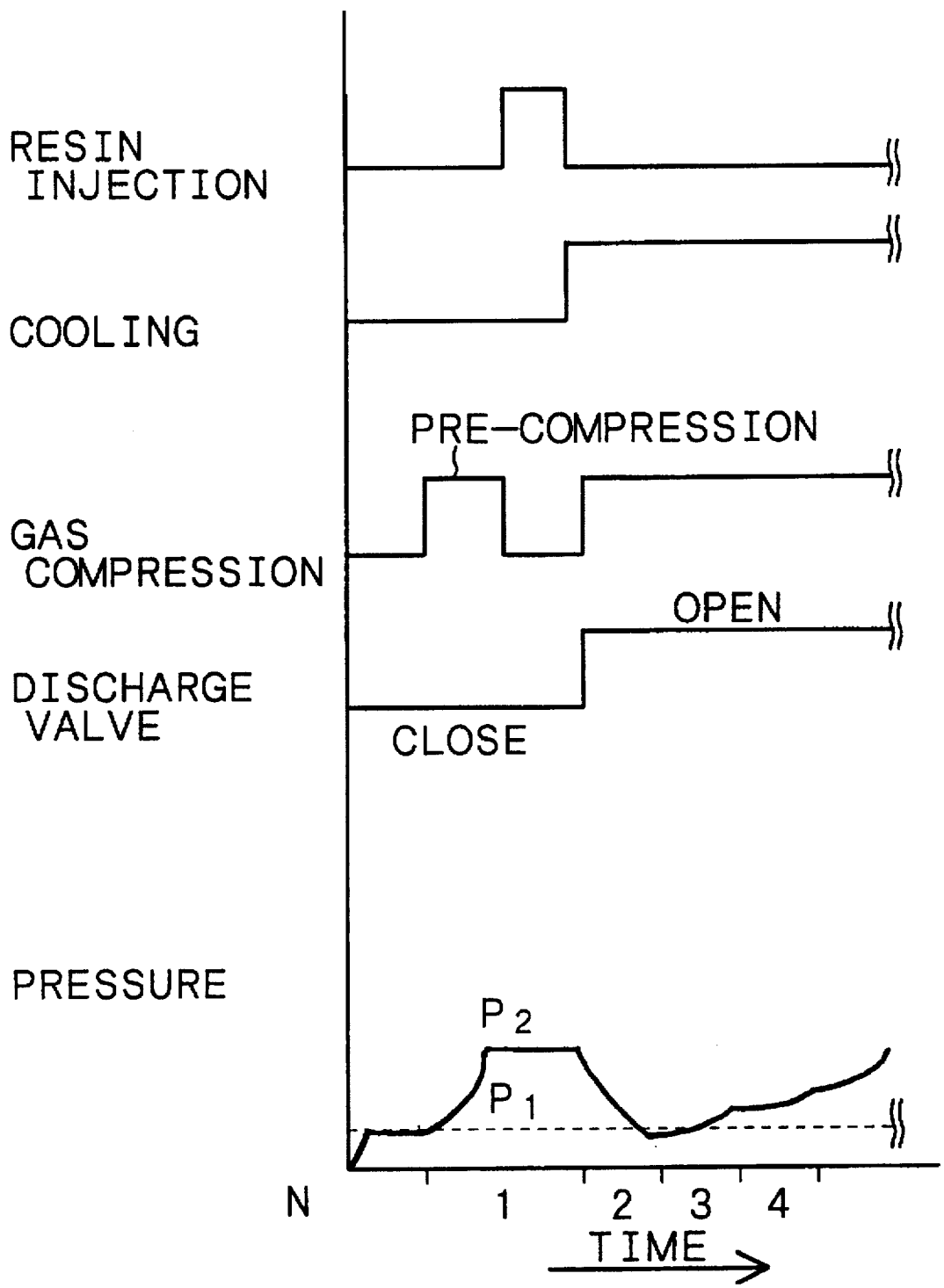

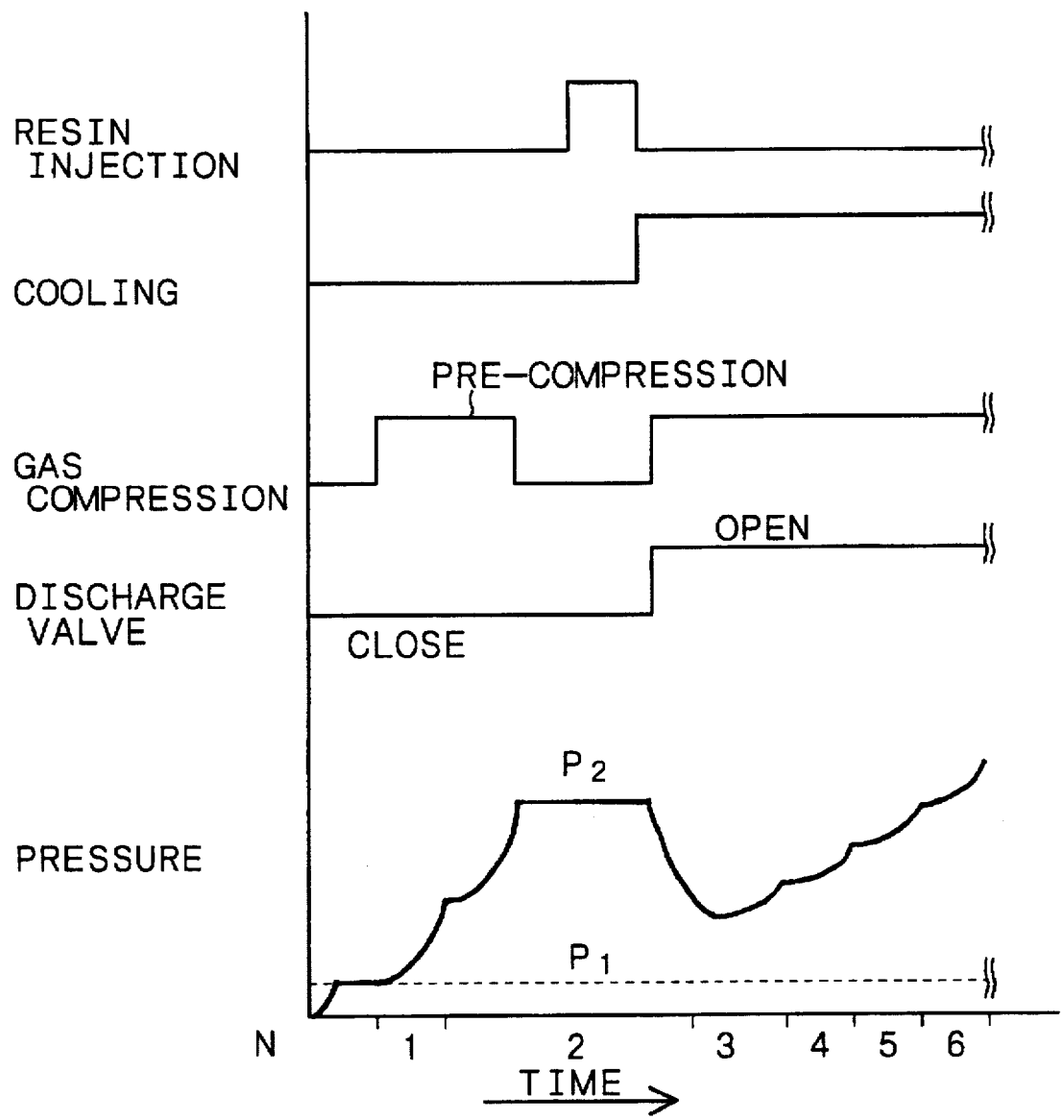

MOLDING METHOD FOR PRODUCING MOLDED ARTICLE HAVING A HOLLOW PORTION

BACKGROUND OF THE INVENTION AND RELATED ART

The present invention relates to a method for the production of a molded article having a hollow portion by introducing pressurized gas into a molten resin injected into a cavity of a mold. More specifically, it relates to a method for the production of a molded article having a hollow portion, which method has high molding reliability without being restricted by the size of a molded article to be produced or the volume of a hollow portion and permits the use of a gas compression apparatus which is small in size, less expensive and highly safe.

In a conventional method for the production of a molded article by introducing pressurized gas into a molten resin injected in a cavity of a mold, on the basis of an injection molding method (to be sometimes referred to as "gas injection method" hereinafter), the following two methods are known for introducing pressurized gas into a molten resin injected into the cavity.

One method uses a piston-type compressor comprising a piston and a cylinder having a fixed volume. In this method, an amount of gas (pressure and volume) required for one injection molding is metered in the cylinder in advance. In injection molding, the gas metered and reserved in the cylinder in advance is introduced into a molten resin in a cavity of a mold while being compressed by movement of the piston within the cylinder, whereby a hollow portion is formed in a molded article. Then, the piston is held in its compressive position to maintain the gas pressure in the hollow portion. This method will be referred to as "metering method" hereinafter. The metering method is disclosed, e.g., in JPA 60-24913 (corresponding to U.S. Pat. No. 4,824,732).

In the other method, gas from a gas source is pressure-increased by a compressor and stored in a pressure tank having a large volume in advance. In injection molding, the gas in the pressure tank is introduced into a molded article in a cavity of a mold through a discharge valve and a pressure regulating valve provided on a discharge side of the pressure tank. This method will be referred to as "constant-pressure method" hereinafter. The constant-pressure method is disclosed, e.g., in JPA 1-128814.

However, the above prior art methods have the following problems.

(1) Problems of the metering method (1-1) The volume of a cylinder is fixed. When the hollow portion of a molded article is large, it is sometimes difficult to generate gas pressure required for forming a desired hollow portion even if gas is provided in the maximum (largest) amount. In this case, it is therefore difficult to produce a molded article of high quality.

(1-2) When the amount of gas to be introduced into a molten resin is large, it is required to increase the pressure of gas to be supplied to a cylinder at a metering time. Since, however, a gas cylinder is used as a gas source in most cases, the consumption efficiency of the gas cylinder decreases. That is, when the pressure in the gas cylinder decreases, the gas cylinder can be no longer used.

(1-3) When the volume of a hollow portion to be formed in a molded article is large, it is required to increase the amount of the gas to be introduced into a molten resin by increasing the volume of the cylinder. It is therefore required in some cases to provide a plurality of gas compression apparatus having different capacities depending upon volumes of hollow portions to be formed.

(1-4) When the volume of a hollow portion to be formed in a molded article is small, uneconomically, part of a metered gas is uselessly discarded.

(1-5) Since the pressure of gas is increased by one compression step, the compression ratio is high. It is therefore required to design the piston diameter, the internal diameter of the cylinder and the piston stroke to sizes necessary and sufficient for one injection molding. As a result, the gas compression apparatus is required to have a large capacity, the sealing structure for pressurized gas is complicated, and the cost for producing the gas compression apparatus increases.

(2) Problems of the constant-pressure method (2-1) The energy efficiency is low, since the gas pressure in a pressure tank is required to be higher than the pressure of gas to be introduced into a molded article in a cavity of a mold.

(2-2) The pressure tank is with a risk of explosion since the gas pressure in the pressure tank is maintained constantly at a high level.

(2-3) When gas leaks from a formed hollow portion after the gas is introduced into a molten resin in the cavity, a large amount of gas from the pressure tank may leak out and stay around the mold, and it may endanger workers. A gas injection method generally uses nitrogen gas. When the nitrogen gas concentration in an atmosphere of a working environment sharply increases, workers may be brought into an oxygen-deficient state.

OBJECT AND SUMMARY OF THE INVENTION

It is therefore an object of the present invention to provide a method for the production of a molded article having a hollow portion, in which a gas pressure required for forming the hollow portion can be generated regardless of the volume of the hollow portion to be formed in the molded article, gas can be effectively introduced into a molten resin, it is not necessary to choose a plurality of gas compression apparatus having different sizes (capacities), a gas source in any form can be effectively used, it is avoidable to increase the capacity of a gas compression apparatus, and an inexpensive gas compression apparatus can be employed.

The above object and advantages of the present invention are achieved by a method for the production of a molded article having a hollow portion by utilizing a gas compression apparatus having a gas source, a compressor composed of a piston and a cylinder, and a discharge valve for controlling the flow of pressurized gas discharged from the cylinder, the method including one molding cycle from initiation of injection of the molten resin into the cavity to completion of cooling of the resin in the cavity, said one molding cycle including intake-compression steps at least twice, each of said intake-compression steps comprising an intake step of supplying gas from the gas source to the cylinder and a compression step of compressing the gas by movement of the piston in the cylinder following the intake step and being carried out on the basis of predetermined compressor operation conditions, the pressurized gas being introduced through the discharge valve into a molten resin injected into a cavity of a mold, at every intake-compression step in said one molding cycle, thereby forming the hollow portion in the molded article.

The introduction of the pressurized gas into a molten resin in the cavity of the mold may be initiated during the injection of the molten resin, or at the same time or after the completion of the injection of the molten resin. That is, after the injection of a molten resin into the cavity of the mold is initiated, or at the same time or after the injection is completed, the discharge valve of the gas compression apparatus is opened at a predetermined timing to introduce the pressurized gas into a molten resin. And, by continuing the reciprocating motion of the piston while the pressurized gas is being introduced, the amount of the pressurized gas to be introduced into a molten resin is secured, and the pressure ($P_2$) of the pressurized gas to be introduced into a molten resin can be maintained. When the pressurized gas is introduced into a molten resin in the cavity, the gas is pressure-increased based on the predetermined number of times of the intake and compression steps and based on a predetermined compression profile.

In the method of the present invention, the number of times of the intake steps and the compression steps in one molding cycle can be predetermined on the basis of the pressure ($P_1$) of the gas to be supplied from the gas source to the cylinder in each intake step, the displacement volume ($V_d$) of the piston in each compression step, the pressure ($P_2$) of the pressurized gas to be introduced into a molten resin and the volume ($V_h$) of the hollow portion to be formed. Further, the volume ($V_{gas}$) of the pressurized gas required for forming a hollow portion can be determined on the basis of the volume ($V_h$) of the hollow portion, the pressure ($P_2$) of the pressurized gas to be introduced into a molten resin and the temperature ($T_{gas}$) of the gas.

The predetermined compressor operation conditions include, for example, (A) the pressure ($P_1$) of the gas to be supplied from the gas source to the cylinder in each intake step, (B) an amount of a stroke, operation timing and a moving rate of the piston in each compression step, and (c) the number (N) of reciprocating motions of the piston required for one molding cycle.

In the method of the present invention, after the completion of introduction of the pressurized gas, preferably, while the pressure of the pressurized gas applied to the hollow portion formed in a resin in the cavity is maintained or controlled at a predetermined value, the resin in the cavity is cooled. Then, the pressurized gas in the hollow portion is released, and then the molded article formed of the resin having the hollow portion formed inside is taken out of the mold. The term "releasing of the pressurized gas in the hollow portion" refers to an operation of decreasing the gas pressure in the hollow portion to a level at which the molded article is not deformed by the gas pressure in the hollow portion at a mold opening process.

The pressure of the pressurized gas introduced into a molten resin decreases as the resin in the cavity is cooled. The pressure of the pressurized gas is controlled by operating the piston, for example, at a low speed for preventing the decrease of the above pressure, whereby the pressure of the pressurized gas in the hollow portion can be maintained or controlled at a predetermined value. Since the resin in the cavity is cooled while maintaining or controlling the pressurized gas in the hollow portion at a predetermined pressure value as described above, the occurrence of poor appearances of the molded article such as a sink mark can be prevented. After a point of time when there is no longer a risk of poor appearances such as a sink mark occurring, the gas pressure applied to the hollow portion may be maintained with the discharge value of the gas compression apparatus closed, or the gas pressure may be maintained while the piston of the compressor is held in a compression position with the discharge valve open.

In the method of the present invention, the pressure ($P_1$) of the gas to be supplied from the gas source to the cylinder may be constant in all the intake steps in one molding cycle. Alternatively, the pressure ($P_1$) of the gas to be supplied from the gas source to the cylinder may be set differently from one intake step to another. For example, the pressure ($P_1$) of the gas is set at a higher level in one intake-compression step than that in a preceding intake-compression step in one molding cycle. As a result, the pressure ($P_2$) of the pressurized gas introduced into a molten resin can be further increased, or the pressure elevation rate can be accelerated. On the other hand, the pressure ($P_1$) of the gas is set at a lower level in one intake-compression step than that in a preceding intake-compression step in one molding cycle. As a result, the pressure elevation rate can be decelerated. Further, the pressure elevation rate can be also controlled by other means such as controlling of timing of the piston operation, controlling of moving rate of the piston and controlling of strokes of the piston.

In the above cases, each intake step may be carried out with the discharge valve closed, and the pressurized gas may be introduced into a molten resin by opening the discharge valve after the gas pressure in the cylinder reaches the pressure ($P_2$). Alternatively, each intake step may be carried out with the discharge valve open.

In the method of the present invention, preliminary compression of gas with the compressor, i.e., the intake step(s) and the compression step(s) in the compressor may be carried out before introduction of the pressurized gas into a molten resin. The pressurized gas can be smoothly introduced into a molten resin by increasing the gas pressure in the compressor in advance.

An injection cylinder is used for injecting a molten resin into the cavity of the mold, and it can be selected from conventional injection cylinders used for injection-molding thermoplastic resins.

The mold used in the present invention has a conventional form. A gas-introducing apparatus is provided in a molten resin nozzle portion of the injection cylinder or in the mold, for introducing the pressurized gas into a molten resin injected in the cavity of the mold. When the gas-introducing apparatus is provided in the mold, the gas-introducing apparatus may be provided in a resin injection portion or a gate portion provided in the mold, or it may be provided in other portion in the mold.

The compressor suitable for use in the method of the present invention, is a compressor which compresses a gas by reciprocating a piston in a cylinder with driving means, and specifically, it is preferred to use a piston-type compressor having a cylinder having a small volume, for generating high-pressure gas. As driving means for reciprocating the piston, the driving means using pressurized air has a simple structure in mechanical constitution, while the driving means using hydraulic pressure may be used. When the driving means using hydraulic pressure is employed, the moving rate of the piston can be precisely controlled, and the driving means can be decreased in size by increasing the hydraulic pressure. As driving means, an electric motor including a servo motor may be used. In this case, more precise control and faster response of moving rate and a stroke of the piston can be attained by using a ball screw.

The gas compressor apparatus in the present invention is preferably further provided with a gas pressure setting device, a gas supply valve, a first check valve provided in the upstream of the compressor (to be referred to as "intake-side check valve" hereinafter), a second check valve provided in the downstream of the compressor (to be referred to as "discharge-side check valve" hereinafter), and a filter provided in the downstream of the discharge valve.

The pressure ($P_2$) of the pressurized gas to be introduced into a molten resin can be brought into a constant value, or can be changed stepwise, by controlling or setting the pressure ($P_1$) of the gas to be supplied from the gas source to the cylinder and by setting the operation conditions of the compressor. For bringing the pressure ($P_2$) into a constant value, a conventional gas compression apparatus has a complicated structure, since it is required to directly control the pressure ($P_2$) by means of a combination of pressure regulating valves or an electro-magnetic type remote valve. Meanwhile, in the present invention, the pressure ($P_2$) can be brought into a constant value by only setting the operation conditions of the compressor, so that the gas compression apparatus can be structurally simplified.

The gas is preferably selected from inert gases such as nitrogen gas and the like. A nitrogen gas cylinder or liquid nitrogen is preferably used as a gas source. Since the nitrogen gas has a high purity in this case, defectives such as discoloration of a molded article can be prevented. On the other hand, a nitrogen separator may be used as a gas source, and nitrogen gas generated with the nitrogen separator may be directly used. Alternatively, for some thermoplastic resins, an air compressor may be used as a gas source, and pressurized air may be used for forming a hollow portion.

For determining whether or not pressurized gas is normally introduced into a molten resin injected into the cavity of the mold, the method of the present invention includes that the gas pressure is monitored with a gas pressure detector arranged in the cylinder of the compressor or in the downstream of the second check valve, an alarm is connected to the gas pressure detector, and an alarm is given when the pressure of the pressurized gas is out of the range of predetermined values.

BRIEF DESCRIPTION OF THE DRAWINGS

The present invention will be explained in detail with reference to drawings hereinafter.

FIG. 6 shows a schematic timing chart of parts of the intake-compression steps in an embodiment in which the preliminary compression is carried out for maintaining the gas pressure in the cylinder at a higher level that that of the gas supplied from the gas source by operating the piston in a compressive direction by a predetermined stroke with the discharge valve closed.

FIG. 7 shows a schematic timing chart of parts of the intake-compression steps in an embodiment in which the preliminary compression is carried out for maintaining the gas pressure in the cylinder at a higher level than the pressure of the gas supplied from the gas source by carrying out the intake step and the compression step a plurality of times with the discharge valve closed.

DESCRIPTION OF THE PREFERRED
EMBODIMENTS

Figure 1:
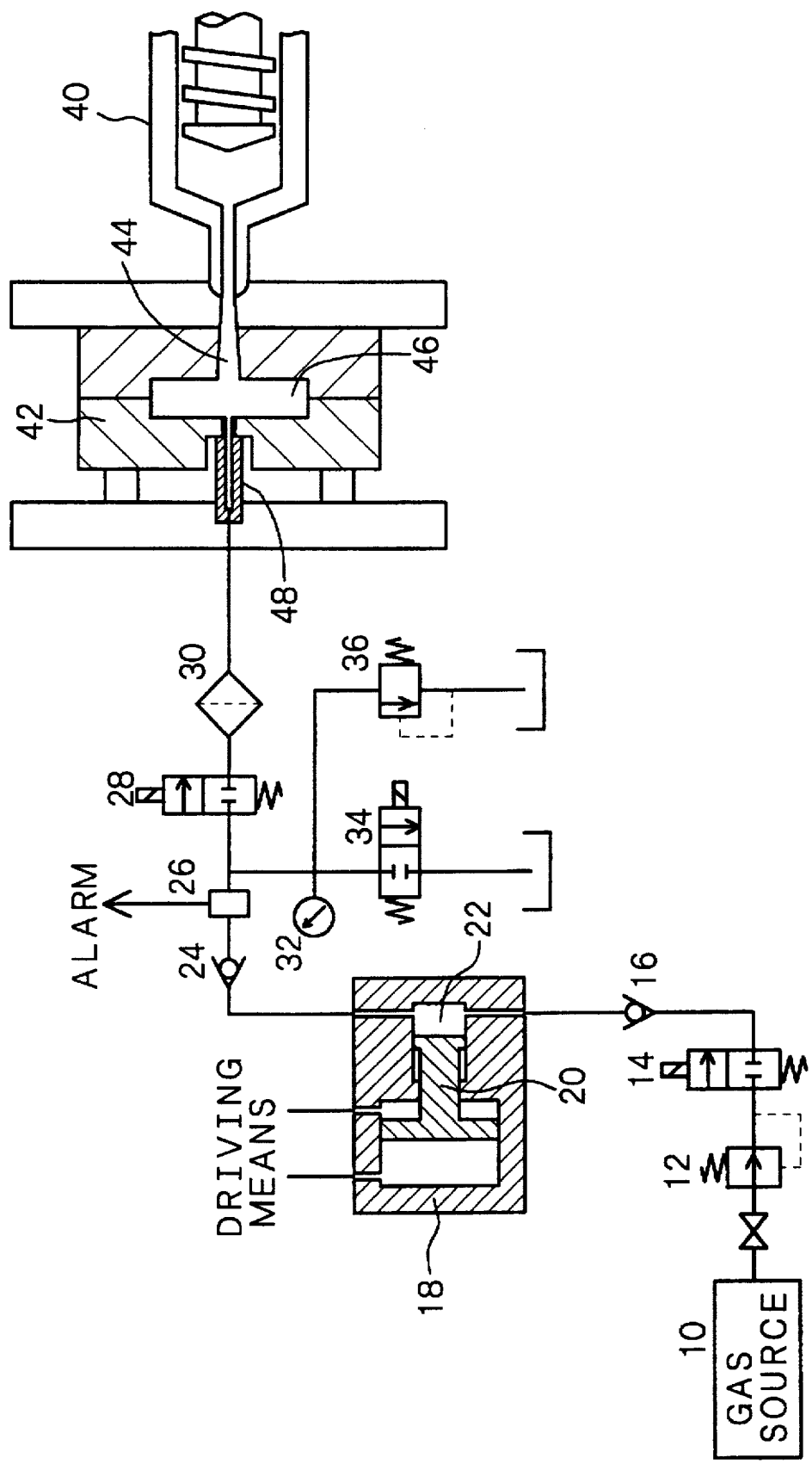
FIG. 1 schematically shows a view of a system of the whole of apparatus including an injection molding machine and a gas compression apparatus suitable for working the present invention.

FIG. 1 shows a schematic system of the whole of apparatus including an injection molding machine and a gas compression apparatus suitable for working the present invention.

The gas compression apparatus is composed of a gas source 10 formed, e.g., of a nitrogen gas cylinder, a gas pressure setting device 12, a gas supply valve 14, an intake-side check valve 16, a compressor 18, a discharge-side check valve 24, a discharge valve 28 and a filter 30. The compressor 18 is composed of a piston 20 and a cylinder 22. Arranged in the downstream of the discharge-side check valve 24 are a pressure gauge 32, an exhaust valve 34 and a safety valve 36. Arranged in the downstream of the discharge-side check valve 24 is a gas pressure detector 26 composed of a pressure switch. The gas pressure detector 26 is connected to an alarm (not shown), and it monitors the gas pressure ($P_2$) during a molding step and gives an alarm when the pressure ($P_2$) of the pressurized gas is outside the range of predetermined values. The gas pressure setting device 12 for controlling or setting the pressure of the gas supplied from the gas source 10 is connected to the gas source 10, the gas supply valve 14 is connected to the gas pressure setting device 12, the intake-side check valve 16 is connected to the gas supply valve 14, and the cylinder 22 of the compressor 18 is connected to the intake-side check valve 16. Further, the discharge-side check valve 24 is connected to the cylinder 22, the discharge valve 28 is connected to the discharge-side check valve 24, and the filter 30 is connected to the discharge valve 28. These members are connected through pressure tubing.

The injection molding machine is constituted of an injection cylinder 40, a mold 42 and a gas-introducing apparatus 48. The mold 42 is provided with a molten resin injection portion 44 composed of a sprue portion and a gate portion communicating with a top portion of the injection cylinder 40. The gas-introducing apparatus 48 is provided in that portion of the mold 42 which is other than a portion where the molten resin injection portion 44 is provided. Further, the mold 42 has a cavity 46. One end of the gas-introducing apparatus 48 is connected to the filter 30 through a tubing. The other end of the gas-introducing apparatus 48 is opened to the cavity 46. The gas-introducing apparatus 48 is movable in the directions of left hand side and right hand side in FIG. 1 with moving means such as a hydraulic cylinder (not shown). For preventing a molten resin from flowing into the gas-introducing apparatus 48 to plug the gas-introducing apparatus 48, preferably, a check valve (not shown) is disposed near the other end of the gas-introducing apparatus 48. When the gas-introducing apparatus 48 is moved to a right end by the moving means, the other end of the gas-introducing apparatus 48 is engaged with the mold 42, and the gas-introducing apparatus 48 communicates with the cavity 46. When the gas-introducing apparatus 48 is moved to a left end by the moving means, the other end of the gas-introducing apparatus 48 is disengaged from the mold 42 to form a gap between the other end of the gas-introducing apparatus 48 and the mold 42, whereby the pressurized gas in the hollow portion of a molded article can be released into atmosphere.

The gas supplied from the gas source 10 is compressed in the compressor 18. The movement of the piston 20 of the compressor 18 in the direction of a backward end (movement in the direction of left hand side in FIG. 1) corresponds to the intake step. By the movement of the piston 20 in the direction of the backward end by driving means, the volume of the cylinder 22 increases. Concurrently with the initiation of movement of the piston 20 in the direction of the backward end, gas is supplied into the cylinder 22 from the gas source 10 through the gas pressure setting device 12, the gas supply valve 14 and the intake-side check value 16. When the cylinder 22 is filled with gas by moving the piston 20 up to the backward end and opening the gas supply valve 14 before the initiation of injection of a molten resin, the compression step can be initiated during the injection of a molten resin, or at the same time or immediately after the completion of injection of the molten resin.

When the piston 20 reaches the backward end, the movement of the piston 20 in the direction of a forward end (movement in the direction of right hand side in FIG. 1) by the driving means is initiated. This step corresponds to the compression step in which the gas is compressed by the movement of the piston 20 in the cylinder 22. While the piston 20 is moving in the direction of the forward end or after this movement of the piston 20 is completed, the discharge valve 28 is opened. As a result, the pressurized gas prepared by the compression in the cylinder 22 is introduced into a molten resin in the cavity 46 from the gas-introducing apparatus 48 through the discharge-side check valve 24, the discharge valve 28 and the filter 30.

In Example, the displacement volume ($V_d$) of the piston 20 was set around 100 cm$^3$, the compression rate (moving rate) of the piston 20 was set at a constant value (40 mm/sec), and the amount of a stroke of the piston in the compression step was set at 80 mm. The piston 20 had an internal diameter of 40 mm. The gas from the gas source 10 was set at $P_1$=20 kgf/cm$^2$-G (absolute pressure value:21.033 kgf/cm$^2$) by the gas pressure setting device 12. On the other hand, the volume ($V_h$) of a hollow portion to be formed in a molded article was set at 150 cm$^3$ and the pressure ($P_2$) of the pressurized gas to be introduced into the molten resin was set at 80 kgf/cm$^2$-G (absolute pressure value:81.033 kgf/cm$^2$). The temperature ($T_{gas}$) of the gas was set at 30° C.

Under the above conditions, the volume ($V_{gas}$) of the pressurized gas required for forming the hollow portion is as follows.

$$V_{gas} = V_h \times P_2 \times \{(273/(273 + T_{gas})\} \quad \text{Eq. 1}$$
$$= 150 \times (81.033/1.033) \times (273/308)$$
$$= 10430 \text{ (normal cm}^3\text{)}$$

The number (N) of the intake-compression steps, each of which comprises the intake step and the compression step, in one molding cycle can be calculated as follows.

$$N \times P_1 \times V_d \times \{(273/273 + T_{gas})\} = V_{gas} \quad \text{Eq. 2}$$

On the basis of Eq. 1 and Eq. 2, the value of N can be calculated.

$$N = (V_h/V_d) \times (P_2/P_1) \quad \text{Eq. 3}$$
$$= 5.78 \text{ (times)}$$

When the pressure of the gas to be supplied to the cylinder 22 from the gas source 10 is set as $P_i$ in each intake step, Eq. 2 can be modified as follows.

$$\sum_{i=1}^{N} [P_i \times V_d \times \{(273/(273 + T_{gas})\}] = V_{gas} \quad \text{Eq. 4}$$

Therefore, an optimum value of N can be determined on the basis of Eq. 4 and Eq. 1.

On the basis of the above calculation results, the number (N) of reciprocating motions of the piston 20 can be set at 6 (times), while the number of reciprocating motions of the piston was set at 7 in Example in view of the discharge-side volume of the gas compression apparatus and the volume of the tubing.

In the production of a molded article in Example, a polycarbonate resin (trade name: Iupilon S3000, supplied by Mitsubishi Engineering-Plastics Corp.) was used as a molding material. Prior to injection molding, the molding material was plasticized and melted in the injection cylinder 40 such that it had a resin temperature of 280° C. Further, the gas-introducing apparatus 48 was moved to a right end by the moving means (not shown) to engage the other end of the gas-introducing apparatus 48 with the mold 42, whereby the gas-introducing apparatus 48 communicated with the cavity 46. The amount of the molten resin to be injected was set such that a hollow portion having a volume ($V_h$) of 150 cm$^3$ was reliably formed, and such amount of the molten resin was injected into the cavity 46.

Prior to injection of the molten resin, the intake step of the compressor 18 was initiated, and at the same time, the gas supply valve 14 was opened to supply the gas (pressure $P_1$: 20 kgf/cm$^2$-G) from the gas source 10 into the cylinder 22 through the gas pressure setting device 12, the gas supply valve 14 and the intake-side check valve 16. Concurrently with the completion of the intake step, the gas supply valve 14 was closed. At a point of time when 0.5 second passed after the completion of injection of the molten resin into the cavity 46, the compression step of the compressor 18 was initiated. Concurrently with the initiation of the compression step, or during the compression step, the discharge valve 28 was opened, and the pressurized gas prepared by compression in the cylinder 22 was introduced from the gas-introducing apparatus 48 to the molten resin in the cavity 46 through the discharge-side check valve 24, the discharge valve 28 and the filter 30. The discharge valve 28 was kept open thereafter. The discharge valve 28 may be closed after a predetermined period of time from the completion of the compression step passes.

Then, the intake step of the compressor 18 was resumed, and at the same time, the gas supply valve 14 was opened. Thereafter, the intake-compression steps were repeated 6 times each (totaling 7 times each). Then, the piston 20 was held in its forward end to maintain the gas pressure. In this case, the discharge valve 28 was kept open. The gas supply valve 14 was in a closed state.

Figure 2:
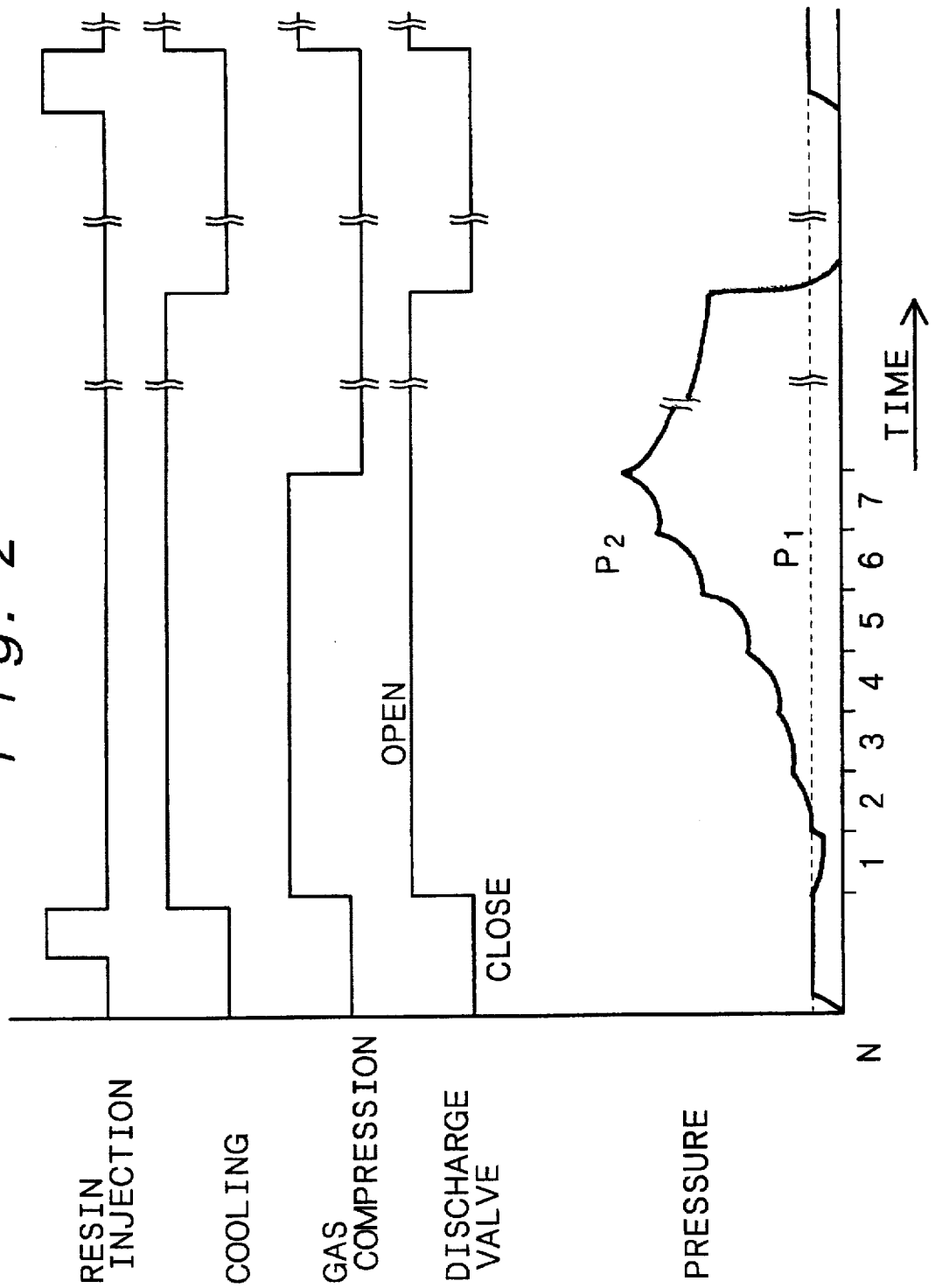
FIG. 2 shows a schematic timing chart of the intake-compression steps in the Example.

FIG. 2 shows a schematic timing chart of each step above. In FIG. 2, a solid curve schematically shows the pressure ($P_2$) of the gas to be introduced into a molten resin, measured with the pressure gauge 32. A dotted line schematically shows the pressure ($P_1$) of the gas to be supplied from the gas source to the cylinder. The above is also the case with FIG. 3 to FIG. 7.

While the gas pressure in the hollow portion was maintained, the resin in the cavity 46 was cooled. The time required for the cooling was 90 seconds long after the initiation of introduction of the pressurized gas. At a point of time when the cooling was completed, the gas pressure measured by the pressure gauge 32 was 85 kgf/cm²-G and was almost the same as a planed value. Thereafter, the gas-introducing apparatus 48 was moved to the left end by the moving means to disengage the other end of the gas-introducing apparatus 48 from the mold 42. As a result, a gap was formed between the other end of the gas-introducing apparatus 48 and the mold 42, and the pressurized gas in the hollow portion was released into atmosphere through the gap. Then, the mold break was conducted, and the molded article having the hollow portion formed inside was taken out of the mold. The hollow portion was formed inside the molded article as designed, and the appearance of the molded article faithfully reproduced the cavity surface of the mold, so that there was not at all any problem on the appearance quality.

The present invention is explained above on the basis of a preferred embodiment, while the present invention shall not be limited to the above embodiment. The conditions in the above embodiment are for the purpose of illustration and may be changed as required.

Figure 3:
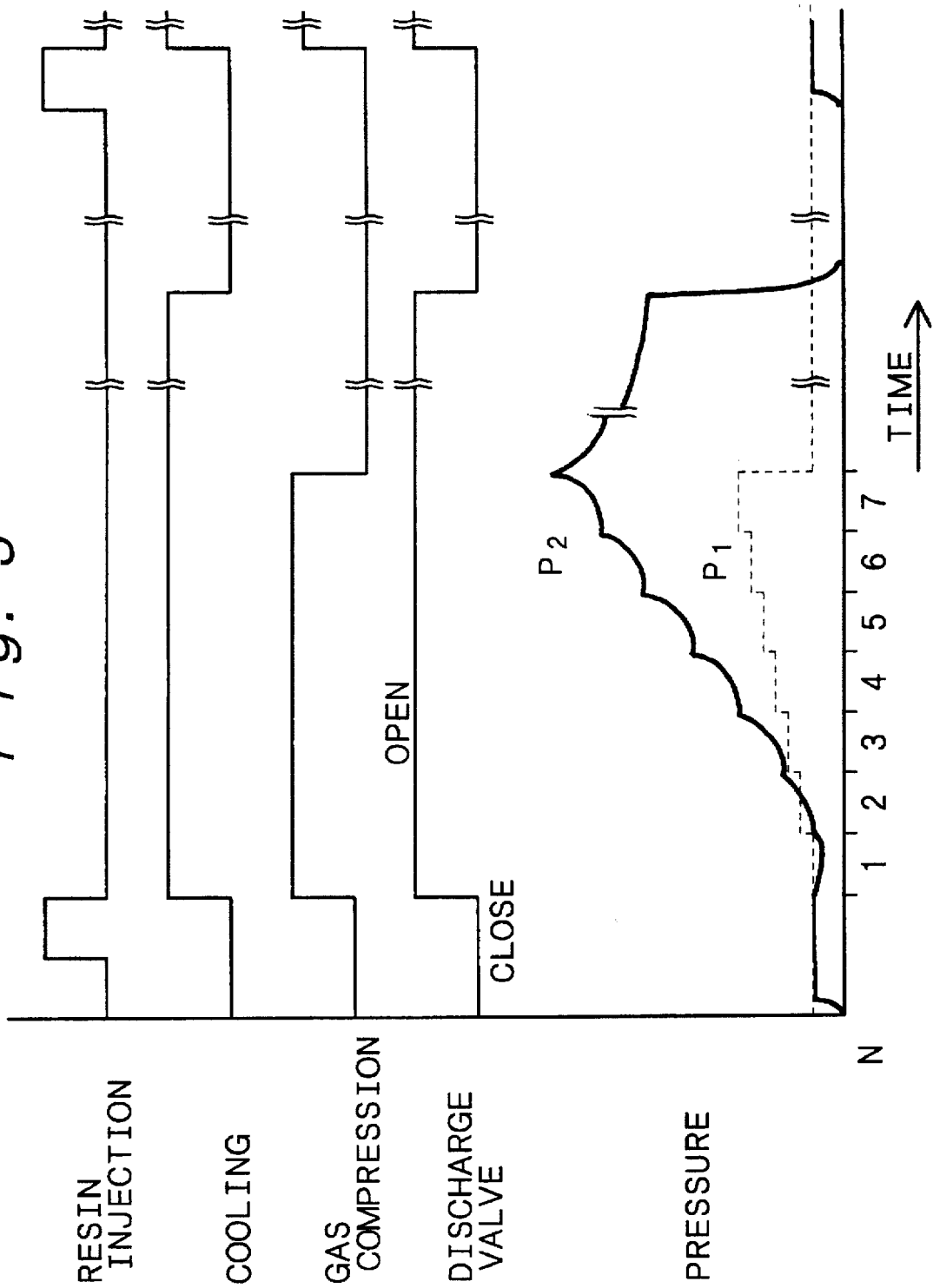
FIG. 3 shows a schematic timing chart of the intake-compression steps in an embodiment in which the pressure of a pressurized gas to be injected into a molten resin is increased by setting the pressure ($P_1$) of the gas supplied from the gas source in one intake-compression step at a higher level than that in a preceding intake-compression step in one molding cycle.

In the above embodiment, the pressure ($P_1$) of the gas supplied from the gas source to the cylinder was set at a constant value in all the intake steps, while the pressure ($P_1$) may be set separately in each step. In this case, the pressure ($P_1$) can be changed by controlling the gas pressure setting device 12 as required. FIG. 3 shows a timing chart of each step in an embodiment in which the pressure ($P_2$) of the pressurized gas to be introduced into a molten resin is increased by setting the pressure ($P_1$) of the gas supplied from the gas source in one intake-compression step at a higher level than the pressure ($P_1$) in a preceding intake-compression step in one molding cycle. In the embodiment shown in FIG. 3, concurrently with the completion of injection of the molten resin into the cavity 46, the compression step of the compressor 18 was initiated.

Figure 4:
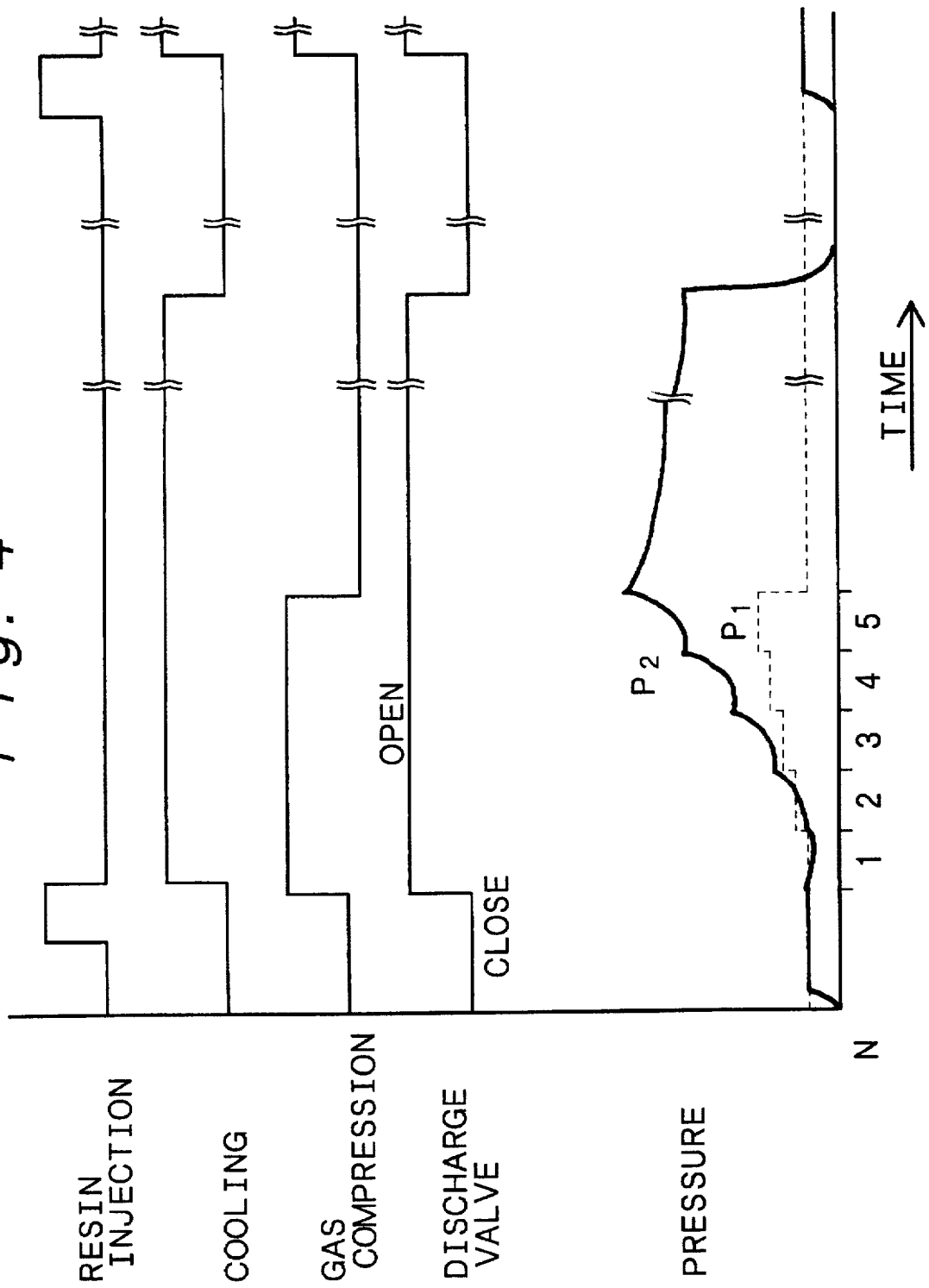
FIG. 4 shows a schematic timing chart of the intake-compression steps in an embodiment in which the pressure elevation rate is accelerated by setting the pressure ($P_1$) of the gas supplied from the gas source in one intake-compression step at a higher level than that in a preceding intake-compression step in one molding cycle.

FIG. 4 shows a timing chart of each step in an embodiment in which the pressure elevation rate is accelerated by setting the pressure ($P_1$) in one intake-compression step at a higher level than the pressure ($P_1$) in a preceding intake-compression step in one molding cycle. In the embodiment shown in FIG. 4, before the completion of injection of the molten resin into the cavity 46, the intake step of the compressor 18 was initiated.

Figure 5:
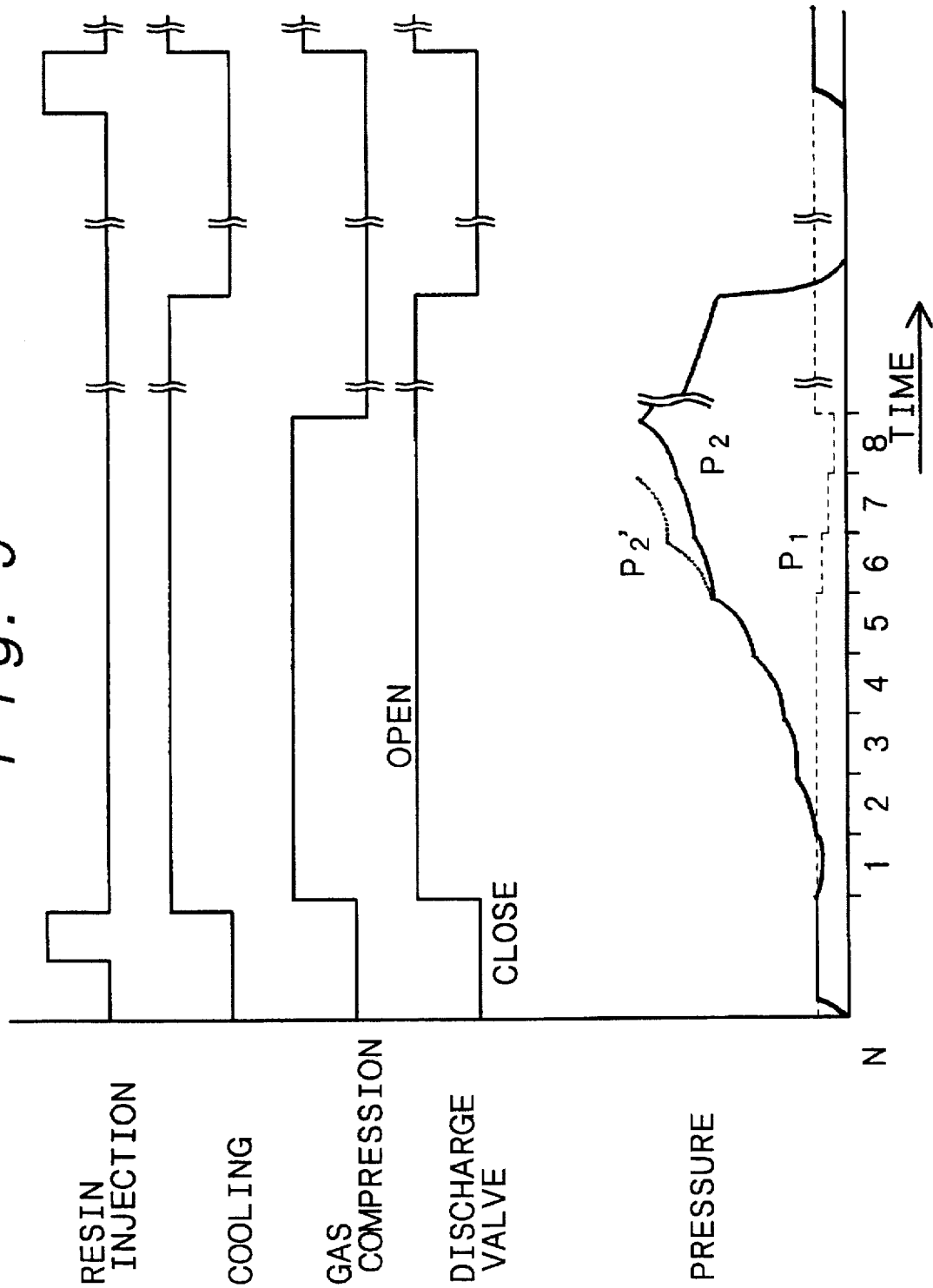
FIG. 5 shows a schematic timing chart of the intake-compression steps in an embodiment in which the pressure elevation rate is decelerated by setting the pressure ($P_1$) of the gas supplied from the gas source in one intake-compression step at a lower level than that in a preceding intake-compression step in one molding cycle.

FIG. 5 shows a timing chart of each step in an embodiment in which the pressure elevation rate is decelerated by setting the pressure ($P_1$) in one intake-compression step at a lower level than the pressure ($P_1$) in a preceding intake-compression step in one molding cycle. In FIG. 5, a curve indicated by a dotted line branching from a curve of a solid line indicates a pressure value ($P_2'$) measured with the pressure gauge 32 when the pressure ($P_1$) was not decreased.

Alternatively, prior to introduction of the pressurized gas into a molten resin, the preliminary compression of the gas with the compressor may be carried out. FIGS. 6 and 7 show timing charts of parts of the steps in this case. FIG. 6 shows a schematic timing chart of parts of steps in an embodiment in which the preliminary compression is carried out for maintaining the gas pressure in the cylinder at a higher level than the pressure ($P_1$) of the gas supplied from the gas source, by operating the piston 20 in a compressive direction by a predetermined stroke with the discharge valve 28 closed.

FIG. 7 shows a schematic timing chart of parts of steps in an embodiment in which the preliminary compression is carried out for maintaining the gas pressure in the cylinder at a higher level than the pressure ($P_1$) of the gas supplied from the gas source, by carrying out the intake step and the compression step a plurality of times (twice in FIG. 7) with the discharge valve 28 closed. In this embodiment, it is preferred to provide a preliminary compression accumulator between the gas pressure detector 26 and the discharge valve 28 in the system shown in FIG. 1 and reserve in the preliminary compression accumulator the pressurized gas obtained by carrying out the intake step and the compression step a plurality of times with the discharge valve 28 closed. The pressurized gas obtained by the preliminary compression is used for the formation of a hollow portion, and the number of the intake step(s) and the compression step(s) carried out for the preliminary compression is included in N.

Further, there may be repeated intake-compression steps a plurality of times in each of which the intake step and the compression step are carried out a plurality of times with the discharge valve 28 closed until the pressurized gas reaches a predetermined pressure value and then the discharge valve 28 is opened to introduce the pressurized gas into a molten resin. In this case, it is preferred to provide a preliminary compression accumulator between the gas pressure detector 26 and the discharge valve 28 in the system shown in FIG. 1 and reserve in the preliminary compression accumulator the pressurized gas obtained by carrying out the intake step and the compression step a plurality of times with the discharge valve 28 closed.

According to the present invention, the amount of gas to be compressed in the compression step is metered each intake step with a compressor having a small volume, and, that amount of the pressurized gas which is required for forming a desired hollow portion can be introduced into a molten resin in the cavity of the mold. The amount of the gas required can be determined based on the volume of the hollow portion and the like, so that the amount of the gas to be consumed is economically minimized.

Further, the number of times of the intake-compression steps are set in advance, whereby the amount of gas to be introduced into a molten resin in the cavity of the mold can be determined. Therefore, various molded articles can be produced with one injection molding machine having the gas-introducing apparatus regardless of the sizes of hollow portions to be formed in the molded articles.

According to the present invention, it is no longer necessary to increase the pressure of gas having a large volume to a high level before initiation of injection molding unlike a conventional gas compression apparatus in a constant-pressure method, since the intake-compression steps, each of which comprises the intake step and the compression step are repeated to introduce pressurized gas into a molten resin in the cavity of the mold. Therefore, the working is improved in safety. Further, a compressor having a small capacity can be used, so that the gas compression apparatus can be downsized, and the cost for its production is therefore decreased. Moreover, when a gas compression apparatus according to a metering method is used, the metered value decreases as the pressure of the gas supplied to the compressor decreases. As a result, the pressure of the gas compressed in the compressor decreases, so that it becomes difficult to generate the pressure required for forming an intended hollow portion. On the other hand, according to the present invention, when a nitrogen gas cylinder is used as a gas source, the number of operations of the compressor can be increased when the pressure of the gas supplied to the cylinder decreases. Therefore, pressurized gas having a pressure required for forming an intended hollow portion in a molten resin in the cavity of the mold can be obtained, and the use efficiency of the gas source is high.

The pressure of the pressurized gas can be easily altered depending upon the number of the compression steps to be carried out in the compressor, and the pressure of the pressurized gas being introduced into a molten resin can be easily controlled by controlling the moving rate of the piston.

What is claimed is:

1. A method for the production of a molded article having a hollow portion by utilizing a gas compression apparatus having a gas source, a compressor composed of a piston and a cylinder, and a discharge valve for controlling the flow of pressurized gas discharged from the cylinder, the method including one molding cycle from initiation of injection of a molten resin into a cavity to completion of cooling of the resin in the cavity, said one molding cycle including at least two intake-compression steps, each of said intake-compression steps comprising an intake step of supplying gas from the gas source to the cylinder and a compression step of compressing and thereby pressurizing the gas by movement of the piston in the cylinder following the intake step and being carried out on the basis of predetermined compressor operation conditions, the pressurized gas being introduced through the discharge valve into the molten resin injected into the cavity of a mold, at every intake-compression step in said one molding cycle, thereby forming the hollow portion in the molded article.

2. The method according to claim 1, wherein the number of times of the intake-compression steps are performed in one molding cycle is predetermined on the basis of the pressure of the gas to be supplied from the gas source to the cylinder in each intake step, a displacement volume of the piston in each compression step, the pressure of the pressurized gas to be introduced into the molten resin, and a volume of the hollow portion to be formed.

3. The method according to claim 1, wherein the predetermined compressor operation conditions are (A) the pressure of the gas supplied from the gas source to the cylinder in each intake step, (B) an amount of a stroke, an operation timing and a moving rate of the piston in each compression step, and (C) the number of reciprocating motions of the piston required for one molding cycle.

4. The method according to claim 1, wherein, after completion of the introduction of the pressurized gas, while the pressure of the pressurized gas applied to the hollow portion formed in the resin in the cavity is maintained or controlled at a predetermined value, the resin in the cavity is cooled, then the pressurized gas in the hollow portion is released, and then the molded article formed of the resin having the hollow portion formed inside is taken out of the mold.

5. The method according to claim 1, wherein the gas to be supplied from the gas source to the cylinder has a constant pressure in each intake step.

6. The method according to claim 1, wherein the pressure of the gas to be supplied from the gas source to the cylinder is set in each intake step.

7. The method according to claim 5, wherein each intake step is carried out with the discharge valve closed.

8. The method according to claim 1, wherein preliminary compression of the gas in the compressor is carried out before the pressurized gas is introduced into the molten resin.

9. The method according to claim 6, wherein each intake step is carried out with the discharge valve closed.

10. The method according to claim 2, wherein the number of times the intake-compression step is performed in one molding cycle is N and N is predetermined by the following formula:

$$N = (V_h/V_d) \times (P_2/P_1)$$

where $V_h$ is a volume of the hollow portion to be formed, $V_d$ is a displacement volume of the piston in each compression step, $P_1$ is a pressure of the gas to be supplied from the gas source to the cylinder in each intake step, and $P_2$ is a pressure of the pressurized gas to be introduced into the molten resin.

* * * * *